(12) United States Patent
Tokuyama

(10) Patent No.: US 11,615,171 B2
(45) Date of Patent: Mar. 28, 2023

(54) TERMINAL DEVICE, INFORMATION PROCESSING METHOD, AND COMPUTER-READABLE RECORDING MEDIUM STORING PROGRAM FOR AUTHENTICATION

(71) Applicant: Masaaki Tokuyama, Tokyo (JP)

(72) Inventor: Masaaki Tokuyama, Tokyo (JP)

( * ) Notice: Subject to any disclaimer, the term of this patent is extended or adjusted under 35 U.S.C. 154(b) by 0 days.

(21) Appl. No.: 17/631,294

(22) PCT Filed: Feb. 6, 2020

(86) PCT No.: PCT/JP2020/004582
§ 371 (c)(1),
(2) Date: Jan. 28, 2022

(87) PCT Pub. No.: WO2021/019807
PCT Pub. Date: Feb. 4, 2021

(65) Prior Publication Data
US 2022/0261462 A1   Aug. 18, 2022

(30) Foreign Application Priority Data
Jul. 31, 2019   (JP) .............................. JP2019-141648

(51) Int. Cl.
*G06F 21/31* (2013.01)
*G06F 3/0346* (2013.01)
*G06F 21/86* (2013.01)

(52) U.S. Cl.
CPC ............ *G06F 21/31* (2013.01); *G06F 3/0346* (2013.01); *G06F 21/86* (2013.01)

(58) Field of Classification Search
CPC ......... G06F 21/31; G06F 3/0346; G06F 21/86
See application file for complete search history.

(56) References Cited

U.S. PATENT DOCUMENTS 8,219,840 B1 *   7/2012   Nanda ..................... G06F 21/31
726/16
8,625,796 B1 *   1/2014   Ben Ayed ............. H04W 12/64
380/258
(Continued)

FOREIGN PATENT DOCUMENTS

CN   101937495 A   1/2011
CN   103339634 A   10/2013
(Continued)

OTHER PUBLICATIONS

Japan Patent Office as International Searching Authority; International Search Report; PCT/JP2020/004582; dated Apr. 7, 2020; 5 pages.
(Continued)

*Primary Examiner* — Aravind K Moorthy
(74) *Attorney, Agent, or Firm* — Foley & Lardner LLP

(57) ABSTRACT

A terminal device includes an authentication information acquirer acquiring pieces of authentication information, an authentication determiner determining whether authentication is successful based on, among the pieces of authentication information acquired by the authentication information acquirer, at least one piece, and an authentication information updater, when the authentication determiner determines that authentication is successful, updating pieces of saved authentication information with pieces of authentication information acquired by the authentication information acquirer. The authentication determiner, in the background, determines that authentication is successful when first authentication information acquired by the authentication information acquirer falls below a predetermined authentication threshold and, when the first authentication information is the authentication threshold or more and a predetermined authentication permissible value or less,
(Continued)

determines whether authentication is successful based on second authentication information acquired by the authentication information acquirer.

7 Claims, 9 Drawing Sheets

(56) References Cited

U.S. PATENT DOCUMENTS

| | | | | |
|---|---|---|---|---|
| 8,925,058 | B1* | 12/2014 | Dotan | H04L 63/0861 |
| | | | | 726/1 |
| 8,943,309 | B1* | 1/2015 | Schilder | H04L 63/0807 |
| | | | | 713/182 |
| 9,119,539 | B1* | 9/2015 | Dotan | H04L 67/14 |
| 9,158,904 | B1* | 10/2015 | Ross | G06F 21/32 |
| 9,456,343 | B1* | 9/2016 | Mihalache | H04L 63/0892 |
| 9,734,419 | B1* | 8/2017 | Ye | G06T 7/85 |
| 10,097,527 | B2 | 10/2018 | Brown | H04L 63/08 |
| 10,354,126 | B1* | 7/2019 | Nagalla | G06V 40/20 |
| 10,452,823 | B2* | 10/2019 | Tokuyama | G06F 21/32 |
| 10,547,610 | B1* | 1/2020 | Faibish | H04L 9/3231 |
| 10,755,512 | B1* | 8/2020 | Fernandez | G07C 9/00571 |
| 10,778,450 | B1* | 9/2020 | Griffin | H04L 9/3273 |
| 11,288,346 | B1* | 3/2022 | Zubovsky | G06F 21/31 |
| 11,341,573 | B1* | 5/2022 | Fiedler | G10L 17/22 |
| 2006/0015725 | A1* | 1/2006 | Voice | H04L 9/3273 |
| | | | | 713/168 |
| 2006/0268875 | A1* | 11/2006 | Hanner | H04L 63/0428 |
| | | | | 370/392 |
| 2007/0283418 | A1* | 12/2007 | Chen | G06F 21/31 |
| | | | | 726/3 |
| 2009/0150320 | A1* | 6/2009 | Geppert | G06F 21/31 |
| | | | | 726/4 |
| 2009/0249478 | A1* | 10/2009 | Rosener | G06F 21/31 |
| | | | | 726/19 |
| 2010/0058460 | A1* | 3/2010 | Kaiser | G06F 21/31 |
| | | | | 726/16 |
| 2010/0064365 | A1* | 3/2010 | Kanduri | G06F 21/31 |
| | | | | 726/21 |
| 2011/0293095 | A1* | 12/2011 | Ben Ayed | H04W 12/50 |
| | | | | 455/26.1 |
| 2012/0011575 | A1* | 1/2012 | Cheswick | H04L 63/08 |
| | | | | 726/5 |
| 2012/0159600 | A1* | 6/2012 | Takagi | G06F 21/32 |
| | | | | 726/7 |
| 2013/0055348 | A1* | 2/2013 | Strauss | G06F 21/40 |
| | | | | 726/3 |
| 2013/0167215 | A1* | 6/2013 | Yang | G06F 21/35 |
| | | | | 726/7 |
| 2013/0182279 | A1* | 7/2013 | Yano | G06F 21/608 |
| | | | | 358/1.14 |
| 2013/0283372 | A1 | 10/2013 | Tsukamoto et al. | |
| 2014/0282868 | A1* | 9/2014 | Sheller | G06F 21/31 |
| | | | | 726/3 |
| 2015/0121544 | A1* | 4/2015 | He | H04L 63/107 |
| | | | | 726/27 |
| 2015/0161370 | A1* | 6/2015 | North | G07C 9/37 |
| | | | | 726/5 |
| 2015/0193669 | A1* | 7/2015 | Gu | G06V 40/13 |
| | | | | 348/77 |
| 2015/0339472 | A1 | 11/2015 | Baughman et al. | |
| 2015/0379254 | A1* | 12/2015 | Matsuda | G06F 21/32 |
| | | | | 726/19 |
| 2016/0134608 | A1* | 5/2016 | Hughes | G06F 21/31 |
| | | | | 726/5 |
| 2016/0212113 | A1* | 7/2016 | Banerjee | H04W 12/06 |
| 2016/0275324 | A1* | 9/2016 | Powell | G06Q 20/405 |
| 2017/0063852 | A1* | 3/2017 | Azar | G06V 40/70 |
| 2018/0035013 | A1* | 2/2018 | Share | H04L 63/083 |
| 2018/0041510 | A1* | 2/2018 | Burch | H04L 63/18 |
| 2018/0121684 | A1* | 5/2018 | Goldberg | G06F 21/445 |
| 2018/0203600 | A1* | 7/2018 | Hajimusa | G06F 21/45 |
| 2018/0224989 | A1* | 8/2018 | Deasy | G06F 3/0233 |
| 2018/0249070 | A1* | 8/2018 | Lau | H04N 5/23222 |
| 2018/0260567 | A1* | 9/2018 | Ullom | G06F 21/35 |
| 2018/0330068 | A1* | 11/2018 | Mori | G06F 3/012 |
| 2019/0018942 | A1* | 1/2019 | Takada | G06V 40/50 |
| 2019/0026456 | A1* | 1/2019 | Hon | G06F 21/40 |
| 2019/0130082 | A1* | 5/2019 | Alameh | G06F 21/6218 |
| 2019/0130083 | A1* | 5/2019 | Agassy | G06V 40/1347 |
| 2019/0132482 | A1* | 5/2019 | Sue | G06F 21/31 |
| 2019/0180039 | A1* | 6/2019 | Considine | G06Q 10/0635 |
| 2019/0196755 | A1* | 6/2019 | Nishi | G06F 3/1217 |
| 2019/0207975 | A1* | 7/2019 | Wardman | H04L 63/102 |
| 2019/0238533 | A1* | 8/2019 | Pointner | G06V 40/168 |
| 2019/0258788 | A1* | 8/2019 | Hyun | G06F 1/1686 |
| 2019/0268325 | A1* | 8/2019 | Roper | H04L 63/083 |
| 2019/0334921 | A1* | 10/2019 | Pattar | H04L 9/3271 |
| 2019/0368287 | A1* | 12/2019 | Shekhar | G01B 21/22 |
| 2020/0045038 | A1* | 2/2020 | Mumma | G06F 21/41 |
| 2020/0151430 | A1* | 5/2020 | Hassan | G06F 21/32 |
| 2020/0202813 | A1* | 6/2020 | Liu | G09G 5/10 |
| 2020/0213298 | A1* | 7/2020 | Ericson | H04W 12/47 |
| 2020/0274704 | A1* | 8/2020 | Matsui | H04L 9/321 |
| 2020/0322792 | A1* | 10/2020 | Shimada | G06Q 20/4015 |
| 2020/0334683 | A1* | 10/2020 | Zhuang | G06Q 20/367 |
| 2020/0380523 | A1* | 12/2020 | Agrawal | G06Q 20/3226 |
| 2021/0192183 | A1* | 6/2021 | Hasegawa | H04L 63/08 |
| 2022/0335111 | A1* | 10/2022 | Lee | G06Q 20/40 |

FOREIGN PATENT DOCUMENTS

| | | |
|---|---|---|
| JP | 2001-338295 A | 12/2001 |
| JP | 2004-054496 A | 2/2004 |
| JP | 2005-122700 A | 5/2005 |
| JP | 2005-141436 A | 6/2005 |
| JP | 2005-173930 A | 6/2005 |
| JP | 2006-259925 A | 9/2006 |
| JP | 2008-310743 A | 12/2008 |
| JP | 2010-074640 A | 4/2010 |
| JP | 2011-118561 A | 6/2011 |
| JP | 2011-193426 A | 9/2011 |
| JP | 2016-040684 A | 3/2016 |
| JP | 2018-507461 A | 3/2018 |
| JP | 2018-120384 A | 8/2018 |
| JP | 2019-021055 A | 2/2019 |
| WO | WO-2016/175333 A1 | 11/2016 |
| WO | WO-2016/175334 A1 | 11/2016 |

OTHER PUBLICATIONS

Japan Patent Office as International Searching Authority; Written Opinion; PCT/JP2020/004582, dated Apr. 7, 2020; 4 pages.
International Search Report and Written Opinion dated Jul. 14, 2021, PCT Application No. PCT/JP2020/016403, 6 pages.
International Search Report and Written Opinion dated Oct. 29, 2020, in related PCT Application No. PCT/JP2020/013126, 7 pages.
Chinese Office Action issued in corresponding CN Appl. Ser. No. 202080055264.0 dated Jun. 1, 2022 (27 pages).
International Search Report and Written Opinion dated Apr. 7, 2020; 8 pgs.

* cited by examiner

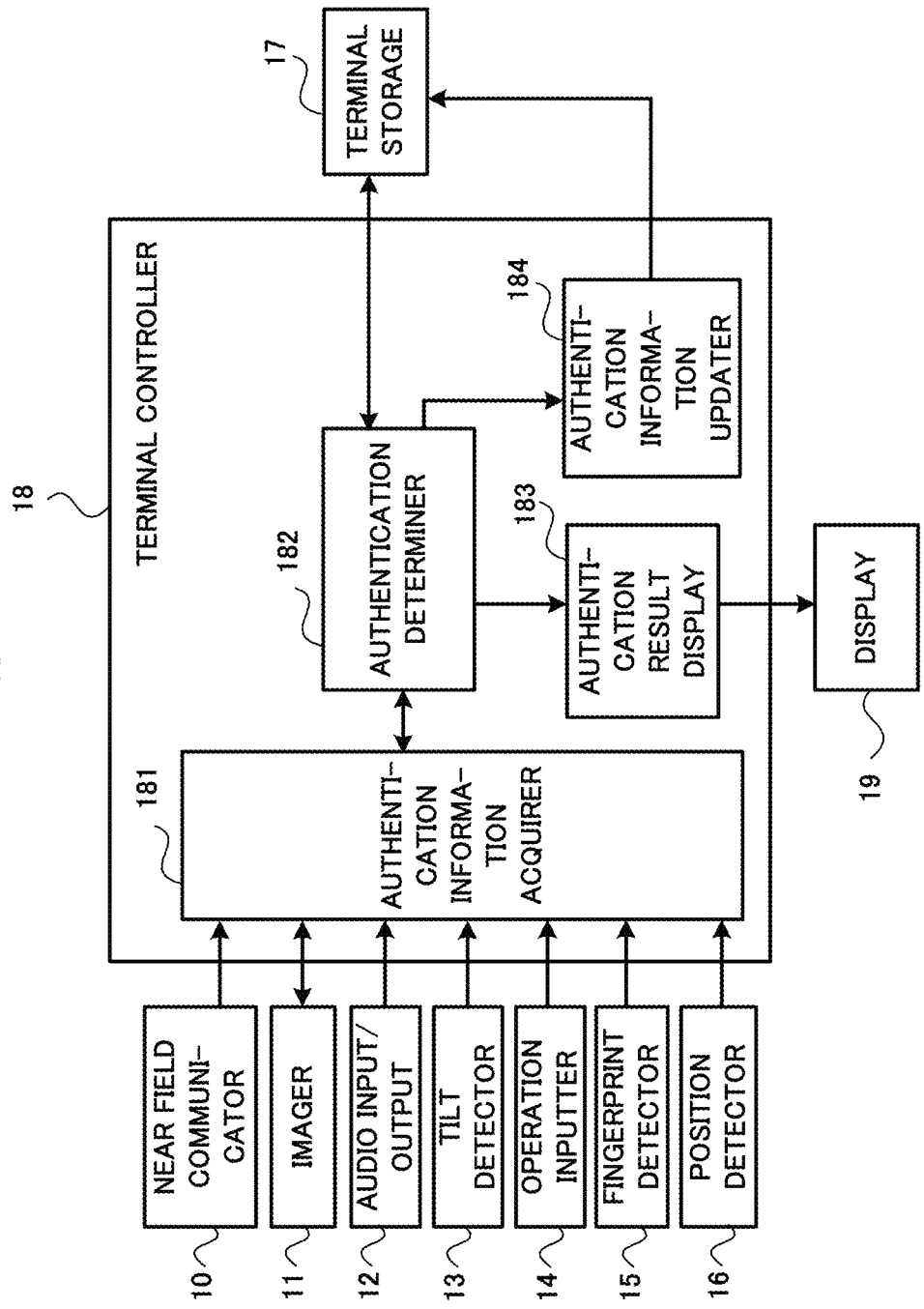

FIG.5A

BIOMETRIC INFORMATION DB FOR AUTHENTICATION 171

| BIOMETRIC INFORMATION TYPE | REGISTRATION INFORMATION | AVERAGE VALUE OF AUTHENTICATION VALUE | AUTHENTICATION PERMISSIBLE VALUE | AUTHENTICATION THRESHOLD |
|---|---|---|---|---|
| FACE | AAA | 0.44 | 0.48 | 0.40 |
| VOICE | ||||||| | 0.32 | 0.38 | 0.27 |
| IRIS | ●○◎△ | 0.49 | 0.55 | 0.42 |
| FINGERPRINT | ×○×× | 0.39 | 0.41 | 0.30 |
| ... | ... | ... | ... | ... |

FIG.5B

ACTION INFORMATION DB FOR AUTHENTICATION 172

| ACTION TYPE | ACQUIRED INFORMATION | LATEST STATE | PASS CONDITION |
|---|---|---|---|
| COMMUNICATION CONNECTION | ABC_WLAN | 31 TIMES | TIMES OF CONNECTION: 100 OR MORE |
| COMMUNICATION CONNECTION | 123WLAN | 157 TIMES | TIMES OF CONNECTION: 100 OR MORE |
| EVENT EXECUTION | ○× PARK | 113 M | DISTANCE: WITHIN 100 M |
| EVENT EXECUTION | △●MOVIE THEATER | 72 M | DISTANCE: WITHIN 100 M |
| DISTANCE BETWEEN FACE AND TERMINAL DEVICE | — | 262 MM | DISTANCE: WITHIN PLUS OR MINUS 20 MM |
| DEVICE CONNECTION | DEFGH | CONNECTING | CONNECTING |
| ... | ... | ... | ... |

FIG.5C

TILT INFORMATION TABLE 173

| ANGLE | ACQUISITION DATE AND TIME | STANDBY TIME |
|---|---|---|
| 127 DEGREES | JUL/12/2019 11:25:32 | 0.5 SEC |

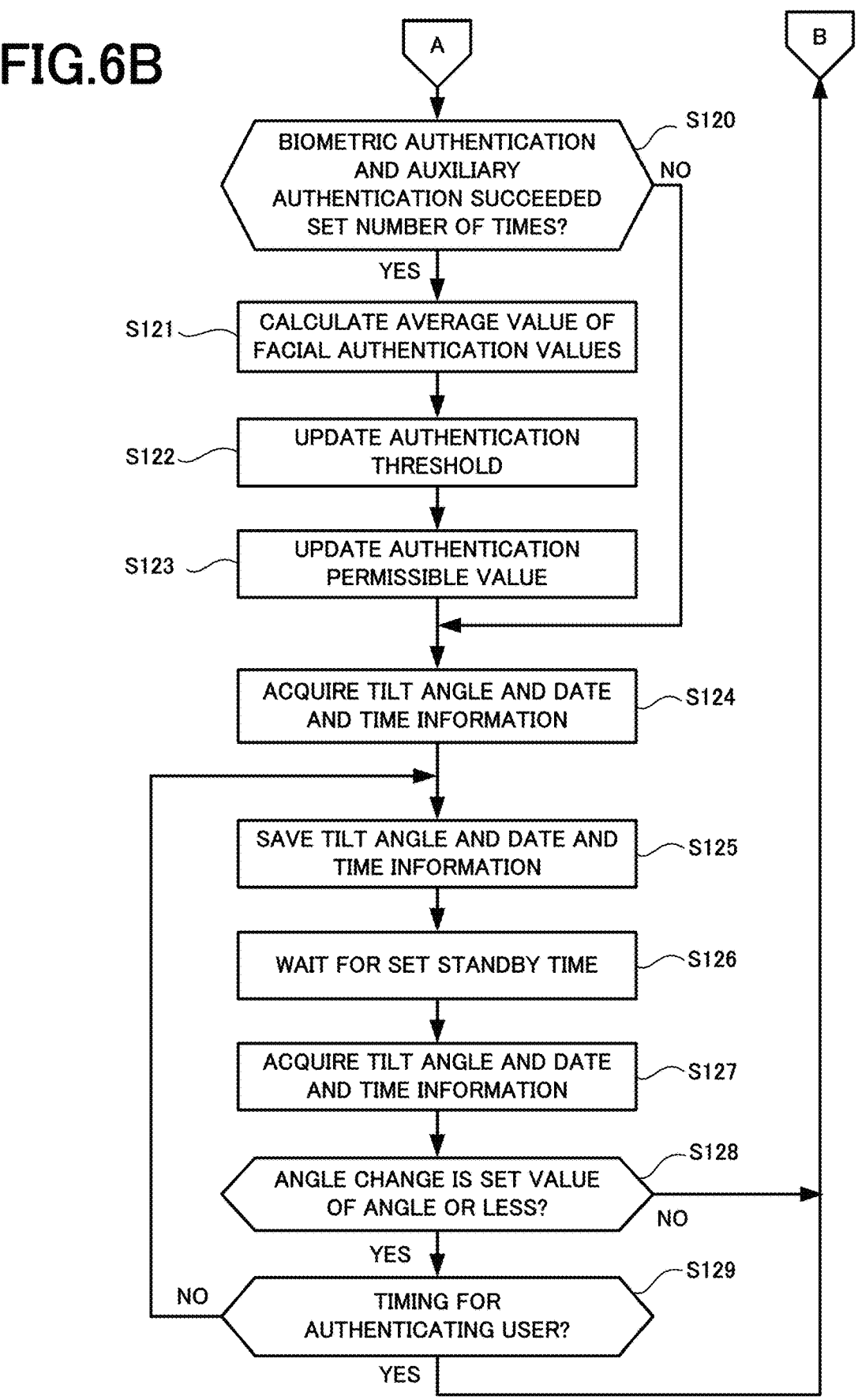

TERMINAL DEVICE, INFORMATION PROCESSING METHOD, AND COMPUTER-READABLE RECORDING MEDIUM STORING PROGRAM FOR AUTHENTICATION

TECHNICAL FIELD

The present disclosure relates to a terminal device, an information processing method, and a program.

BACKGROUND ART

Generally, terminal devices are provided with authentication function to prevent unauthorized use and are configured such that respective functions can be used only after authentication is successful. In authentication processing, various types of biometric information are used in addition to a general password. However, biometric information often causes false recognition, and there occurs a case where a legitimate user cannot be authenticated. Accordingly, for example, in Patent Literature 1, a technology for, when authentication based on a type of biometric information is not successful, authenticating a user by combining a plurality of types of biometric information or combining biometric information and non-biometric information, such as a login-specific IC card and a personal identification number, is disclosed.

CITATION LIST

Patent Literature

Patent Literature 1: Unexamined Japanese Patent Application Publication No. 2016-040684

SUMMARY OF INVENTION

Technical Problem

In the technology disclosed in Patent Literature 1, when a type of authentication is not successful, a user inputs a plurality of types of biometric information and a plurality of types of non-biometric information to be used in authentication processing in order. For example, when fingerprint authentication is not successful, the user needs to perform vein authentication, logging in using a login-specific IC card, input of a personal identification number, and the like in order. Thus, there is a problem in that an operational burden on the user in the authentication is heavy.

The present disclosure has been made to solve the above-described problem, and an objective of the present disclosure is to provide a terminal device, an information processing method, and a program that are capable of reducing an operational burden on a user in authentication.

Solution to Problem

In order to achieve the above-described objective, a terminal device according to the present disclosure includes an authentication information acquirer that acquires a plurality of pieces of authentication information, an authentication determiner that determines whether or not authentication is successful based on, among a plurality of pieces of authentication information acquired by the authentication information acquirer, at least a piece of authentication information or a plurality of pieces of authentication information, and an authentication information updater that, when the authentication determiner determines that authentication is successful, updates a plurality of pieces of saved authentication information with a plurality of pieces of authentication information acquired by the authentication information acquirer. The authentication determiner, in the background, determines that authentication is successful when first authentication information acquired by the authentication information acquirer falls below a predetermined authentication threshold and, when the first authentication information is greater than or equal to the authentication threshold and less than or equal to a predetermined authentication permissible value, determines whether or not authentication is successful based on second authentication information acquired by the authentication information acquirer.

Advantageous Effects of Invention

Since a terminal device according to the present disclosure enables whether or not authentication is successful to be determined based on, among a plurality of pieces of acquired authentication information, at least a piece of authentication information or a plurality of pieces of authentication information, it is possible to reduce an operational burden on a user in authentication.

BRIEF DESCRIPTION OF DRAWINGS

FIG. 4 is a diagram of information processing blocks of the terminal device illustrated in FIG. 1;

FIG. 5A is a diagram illustrating a table of a biometric information database for authentication acquired from the terminal device illustrated in FIG. 4;

FIG. 5B is a diagram illustrating a table of an action information database for authentication acquired from the terminal device illustrated in FIG. 4;

FIG. 5C is a diagram illustrating a tilt information table of the terminal device illustrated in FIG. 4;

FIG. 6B is a flowchart continuing from the flowchart of the authentication processing illustrated in FIG. 6A.

DESCRIPTION OF EMBODIMENTS

Figure 1:
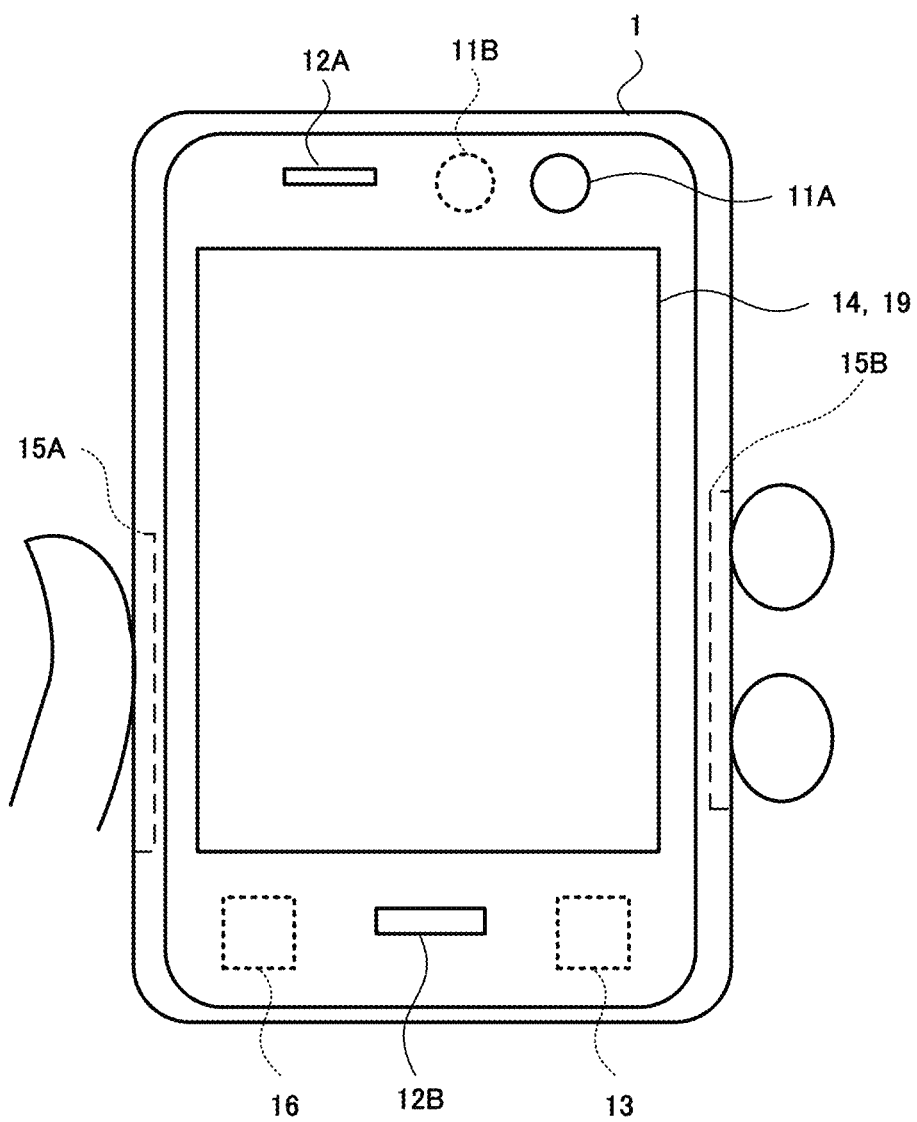
FIG. 1 is a front view of a terminal device according to an embodiment of the present disclosure.

The following describes a terminal device, an information processing method, and a program according to an embodiment for embodying the present disclosure in detail with reference to the drawings. Note that the same or corresponding parts in the drawings are designated by the same reference numerals.

A terminal device 1 according to the present embodiment is a device that authenticates a user himself/herself, based on biometric information, such as a facial image, a fingerprint, and a voiceprint of the user himself/herself, and action information, such as a user-specific behavior and an operation state when the user operates the terminal device 1, and enables the user to execute various functions in the terminal device 1. User authentication processing that is performed in the terminal device 1 is processing that is executed in the background and, at the same time, is capable of improving accuracy of authentication by updating the biometric information and action information of the user, while the terminal device 1 is in operation.

A front view of the terminal device 1 is illustrated in FIG. 1. The terminal device 1 is a so-called smartphone, and the terminal device 1 includes, on the front surface, an in-camera 11A that captures a photograph of the face of the user, a speaker 12A, a microphone 12B that is a microphone for a call, a tilt detector 13 that detects a tilt of the terminal device 1, a touch panel that serves as an operation inputter 14 as well as a display 19, a left fingerprint sensor 15A and a right fingerprint sensor 15B that detect fingerprints of the user, and a position detector 16 that detects a current position of the terminal device 1. In addition, the terminal device 1 includes, on the back surface, a main camera 11B that is capable of capturing a photograph of a person, a landscape, an object, and the like as seen by the user.

Hereinafter, the in-camera 11A and the main camera 11B are collectively referred to as an imager 11. In addition, hereinafter, the speaker 12A and the microphone 12B that is a microphone for a call, are collectively referred to as an audio input/output 12. Further, hereinafter, the left fingerprint sensor 15A and the right fingerprint sensor 15B are collectively referred to as a fingerprint detector 15.

Figure 2:
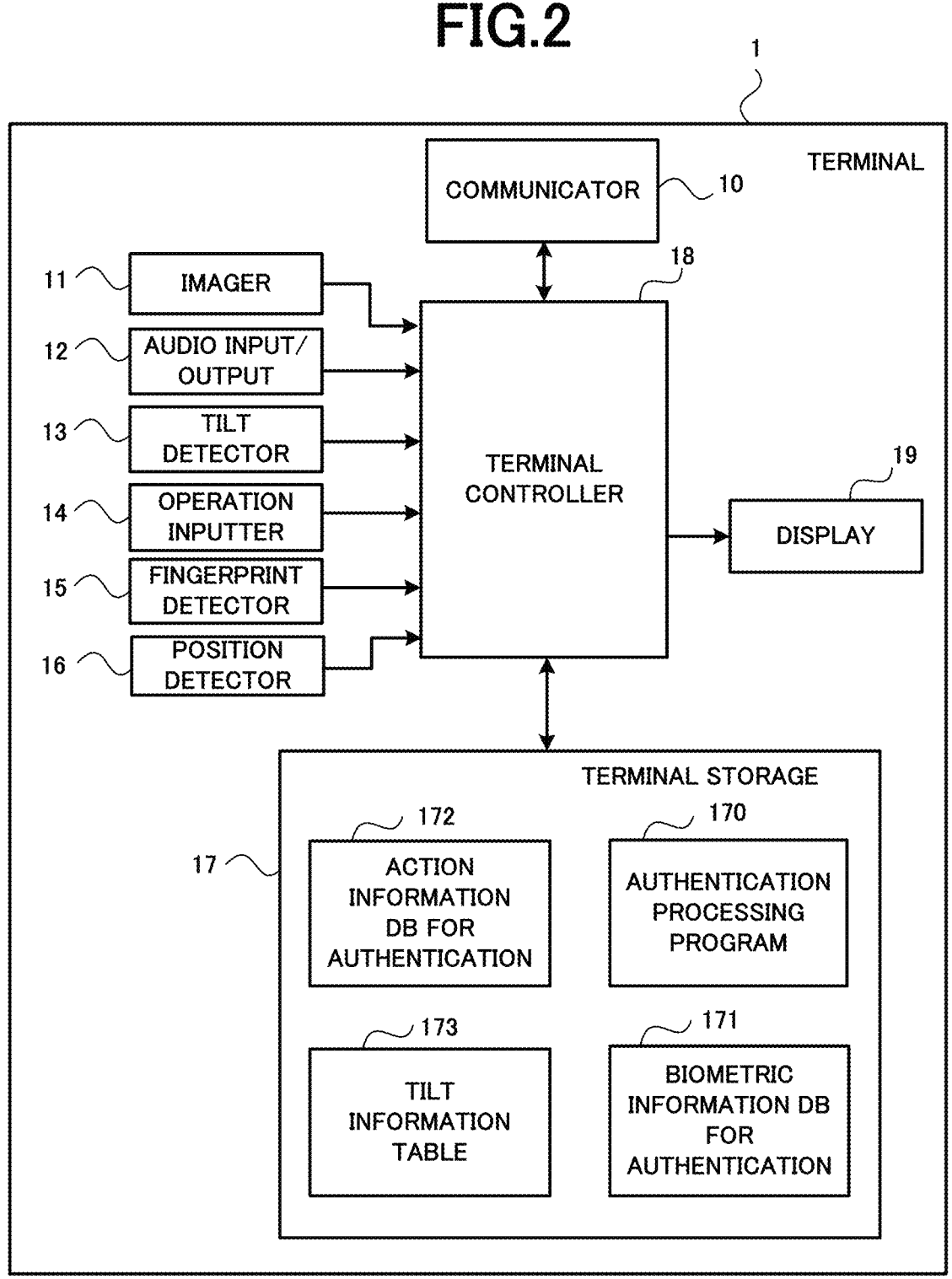
FIG. 2 is a block diagram of the terminal device illustrated in FIG. 1.

FIG. 2 is a block diagram illustrating a configuration of the terminal device 1. The terminal device 1 includes a communicator 10, the imager 11, the audio input/output 12, the tilt detector 13, the operation inputter 14, the fingerprint detector 15, the position detector 16, a terminal storage 17, a terminal controller 18, and the display 19.

The communicator 10 includes a data communicator that communicates with an external server, a cloud, and the like via a not-illustrated communication network and that transmits and receives various data and an audio communicator that transmits and receives wireless signals for telephone communication to and from a not-illustrated base station. The data communicator can be configured by using a wireless local area network (LAN), Wi-Fi (registered trademark), Bluetooth (registered trademark), or the like. In addition, the audio communicator can be configured by using a communication device that transmits and receives wireless signals for telephone communication to and from a base station.

The imager 11 includes the in-camera 11A and the main camera 11B illustrated in FIG. 1. For the imager 11, various cameras, such as a camera and a video camera in which an imaging element, such as a charge coupled device (CCD) image sensor and a complementary metal oxide semiconductor (CMOS) image sensor, is used, that is capable of capturing a still image or a moving image and acquiring the captured still image or moving image can be used.

The audio input/output 12 includes the speaker 12A and the microphone 12B illustrated in FIG. 1. The speaker 12A outputs a voice received through a voice call, music data acquired from the outside via the communication network, and the like. The microphone 12B is a device that picks up a voice of the user.

The tilt detector 13 is a device that is capable of detecting a tilt, shaking, and the like of the terminal device 1. The tilt detector 13 can be configured by using various sensors, such as an acceleration sensor, an angle sensor, and a magnetic sensor detecting geomagnetism, that can detect a tilt of the terminal device 1. Note that the number and the number of types of sensors constituting the tilt detector 13 may be either one or plural.

The operation inputter 14 is a device, illustrated in FIG. 1, through which the user can input an operation. The fingerprint detector 15 is sensors that detect fingerprints of the user. The fingerprint detector 15 includes the left fingerprint sensor 15A and the right fingerprint sensor 15B illustrated in FIG. 1. Note that, as the fingerprint detector 15, not only a fingerprint sensor but also any one of sensors, devices, and the like that are capable of detecting a fingerprint of the user may be used.

The position detector 16 is a device that is capable of detecting a current position of the terminal device 1. The position detector 16 can be configured by using a device, such as a global positioning system (GPS), that is capable of detecting the current position of the terminal device 1.

The terminal storage 17 includes an authentication processing program 170 for performing user authentication processing, a biometric information database for authentication 171 in which pieces of biometric information of the user acquired by the terminal device 1 are collectively stored, an action information database for authentication 172 in which pieces of action information of the user acquired by the terminal device 1 are collectively stored, and a tilt information table 173 for storing a tilt state of the terminal device 1. In addition, in the terminal storage 17, various application programs that are executed in the terminal device 1 are stored.

The authentication processing program 170 is a program that performs processing for authenticating a user, based on biometric information and action information of the user acquired by the terminal device 1. The biometric information database for authentication 171 is a database for storing information on the biometric information of the user and an authentication value used for authentication.

The action information database for authentication 172 is a database for storing information on a user-specific action when the user operates the terminal device 1, an authentication pass condition, and the like. As used herein, the user-specific action refers to an action specific to the user, such as a behavior when the user operates the terminal device 1, a distance between the screen of the display 19 and the face of the user, a keystroke, a way of holding the terminal device 1, a place where the terminal device 1 is used, the number of times of connection to a specific communication network, and start-up and an operation of a specific application.

The tilt information table 173 is a table for storing a tilt angle of the terminal device 1 detected by the tilt detector 13, an acquisition date and time of the tilt angle, and a standby time for acquisition of the tilt angle. Note that details of the authentication processing program 170, the biometric information database for authentication 171, the action information database for authentication 172, and the tilt information table 173 are described later.

The terminal controller 18 executes various programs stored in the terminal storage 17. The terminal controller 18 also acquires various data from the communicator 10, the imager 11, the audio input/output 12, the tilt detector 13, the operation inputter 14, the fingerprint detector 15 and the position detector 16 and processes the acquired data, and stores the processed data in various databases and tables in the terminal storage 17. In addition, the terminal controller 18 is capable of, by transmitting an instruction instructing the imager 11 to capture a photograph, causing the imager 11 to capture a photograph at any timing.

The display 19 displays processing results of the various programs executed by the terminal controller 18. The display 19 is also capable of displaying an image, such as a still image and a moving image, captured by the imager 11, data that are input from the operation inputter 14, and the like. The display 19 is stacked on the operation inputter 14 and constitutes the touch panel illustrated in FIG. 1.

Figure 3:
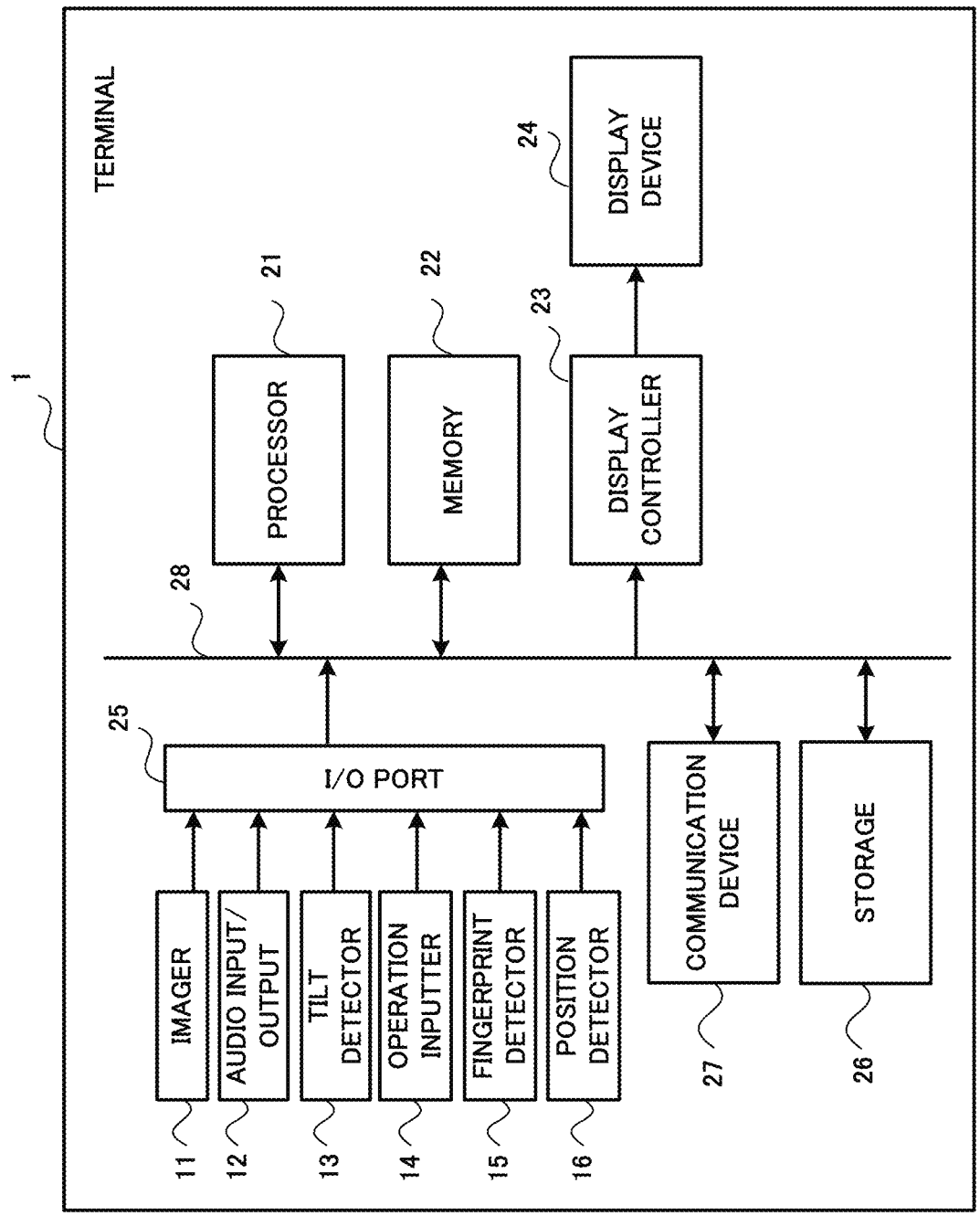
FIG. 3 is a diagram illustrating an example of a hardware configuration of the terminal device illustrated in FIG. 1.

Next, an example of a hardware configuration of the terminal device 1 is described with reference to FIG. 3. The terminal device 1 includes a processor 21 that executes various programs, a memory 22 for loading various programs, a display controller 23 that outputs various display data, a display device 24 that displays various display data, an I/O port 25 for connecting the imager 11, the audio input/output 12, and the like, a storage device 26 that stores various programs and various data, and a communication device 27 that communicates with the outside and transmits and receives various data. The processor 21, the memory 22, the display controller 23, the display device 24, the I/O port 25, the communication device 26, and the communication device 27 are connected to one another via a data bus 28.

The processor 21 reads out various programs stored in the storage device 26, loads the programs into the memory 22, and executes the programs. The processor 21 can be configured by using a processing device, such as a central processing unit (CPU) and a micro-processing unit (MPU). In addition, the memory 22 can be configured by using a storage element like a volatile or non-volatile semiconductor memory, such as a random access memory (RAM) and a flash memory, or a storage medium using such storage elements.

The display controller 23 is a controller that outputs various display data to the display device 24. The display controller 23 can be configured by using a video signal output device, such as a video card, a graphics processing unit (GPU), and a graphic board. In addition, the display device 24 can be configured by using a display device, such as a liquid crystal display (LCD) and an organic electroluminescence (EL) monitor.

The I/O port 25 is a connection port to which the imager 11, the audio input/output 12, the tilt detector 13, the operation inputter 14, the fingerprint detector 15, and the position detector 16 can be connected. The I/O port 25 can be configured by using various ports, such as a universal serial bus (USB) port and an IEEE1394 port, to which devices can be connected.

The storage device 26 is a device that stores various programs executed by the processor 21 and various data used in the various programs. The storage device 26 can be configured by using a storage device, such as a hard disk drive (HDD) and a solid state drive (SSD).

The communication device 27 includes the data communicator that communicates with an external server, a cloud, and the like via a not-illustrated communication network and that transmits and receives various data and the audio communicator that transmits and receives wireless signals for telephone communication to and from a not-illustrated base station. The data communicator can be configured by using a wireless LAN, Wi-Fi (registered trademark), Bluetooth (registered trademark), or the like. In addition, the audio communicator can be configured by using a communication device that transmits and receives wireless signals for telephone communication to and from a base station.

The above-described processor 21 executing the authentication processing program 170 stored in the terminal storage 17 of the terminal device 1 illustrated in FIG. 2 causes information processing blocks illustrated in FIG. 4 to be achieved in the terminal controller 18. This configuration enables the terminal device 1 to authenticate the user himself/herself, based on biometric information, such as a facial image, a fingerprint, and a voiceprint of the user himself/herself, and action information, such as a user-specific behavior and an operation state when the user operates the terminal device 1, and to enable the user to execute various functions in the terminal device 1.

The information processing blocks includes an authentication information acquirer 181 that acquires biometric information and action information for authentication from the communicator 10, the imager 11, and the like, an authentication determiner 182 that authenticates whether or not the user is an authentic user, an authentication result display 183 that displays an authentication result on the display 19, and an authentication information updater 184 that updates information in various databases and tables stored in the terminal storage 17 in accordance with an instruction from the authentication determiner 182.

The authentication information acquirer 181 acquires biometric information and action information for authentication from the communicator 10, the imager 11, and the like. The authentication determiner 182 authenticates a user, based on the biometric information and action information for authentication acquired from the authentication information acquirer 181 and an authentication value, a pass condition, and the like stored in various databases in the terminal storage 17. The authentication result display 183 receives an authentication result of the user from the authentication determiner 182 and causes the display 19 to display a message, an image, or the like according to the authentication result. The authentication information updater 184 updates data stored in various databases and tables stored in the terminal storage 17, based on an instruction from the authentication determiner 182. Note that biometric information and action information acquired by the authentication information acquirer 181 are an example of authentication information in the claims. In addition, various biometric information acquired by the authentication information acquirer 181 is an example of first authentication information and third authentication information in the claims. Various action information acquired by the authentication information acquirer 181 is an example of second authentication information in the claims.

Next, configurations of respective tables of the biometric information database for authentication 171, the action information database for authentication 172, and the tilt information table 173, which are stored in the terminal storage 17, are described below with reference to FIGS. 5A to 5C. First, as illustrated in FIG. 5A, the table of the biometric information database for authentication 171 stores the types of biometric information, such as a face and a voice, registration information that is biometric information of the user himself/herself, and authentication values obtained by comparing the registration information with biometric information acquired by the authentication information acquirer 181 illustrated in FIG. 4. The registration information stored in the table of the biometric information database for authentication 171 is biometric information of the user himself/herself. The registration information is information that was registered in advance before the authentication processing is performed by the terminal device 1 and is updated when the user himself/herself is successfully authenticated. In the registration information, for example, when the type of biometric information is a face, a feature amount obtained from a facial image is stored; when the type of biometric information is a voice, voice data, a feature amount obtained from the voice data, or both voice data and a feature amount thereof are stored; when the type of biometric information is an iris, iris data are stored; and, when the type of biometric information is a fingerprint, a feature amount obtained from a fingerprint image is stored.

In the present embodiment, determination of similarity of biometric information is performed based on an authentication value. The authentication value is a value calculated based on a result of comparing registration information with biometric information acquired by the authentication information acquirer 181 illustrated in FIG. 4. The authentication value approaches 0 when the registration information and the biometric information acquired by the authentication information acquirer 181 are similar to each other, and approaches 1 when the registration information and the biometric information are not similar to each other. The biometric information database for authentication 171 includes an average value of authentication values, an authentication threshold that is a threshold for determining an authentication value, and an authentication permissible value obtained by adding an authentication permissible range value indicating a range in which whether or not the user is an authentic user is indeterminate to the authentication threshold.

First, the average value of authentication values is an average value of authentication values obtained by comparing the registration information with pieces of biometric information acquired by the authentication information acquirer 181. The authentication threshold is a value serving as a criterion for comparing the registration information with biometric information acquired by the authentication information acquirer 181 and determining that the user is an authentic user when the authentication value calculated based on a comparison result is less than or equal to the criterion. The authentication threshold is a value that fluctuates according to the state of authentication of the user, and an upper limit value for the authentication threshold is defined in advance. The upper limit value is a value that is defined in such a manner that the user should not be authenticated as an authentic user only with biometric information when the authentication value is greater than or equal to the value. For example, a default value of an authentication threshold is set at 0.4, which is an intermediate value between an authentication value of 0 that the authentication value approaches when the registration information and biometric information acquired by the authentication information acquirer 181 are similar to each other and an authentication value of 1 that the authentication value approaches when the registration information and the biometric information are not similar to each other. In this case, the upper limit of the authentication threshold is set to a value obtained by adding 0.05, which is a half of ten percent of a difference between an authentication value of 0 that the authentication value approaches in the case of similarity and an authentication value of 1 that the authentication value approaches in the case of dissimilarity, to the default value of the authentication threshold, that is, 0.45.

In addition, the authentication permissible value is a value serving as a criterion for comparing the registration information with biometric information acquired by the authentication information acquirer 181 and determining that the user is not an authentic user when the authentication value calculated based on a result of the comparison is greater than or equal to the criterion. The authentication permissible value is a value obtained by adding an authentication permissible range value indicating a range in which whether or not the user is an authentic user is indeterminate to the authentication threshold, as described above. Thus, the authentication permissible value is a value that fluctuates according to fluctuation of the authentication threshold and the authentication permissible range value. An upper limit value is defined in advance for the authentication permissible value, and the upper limit is referred to as a maximum authentication permissible value. The maximum authentication permissible value is a value that is defined in such a manner that the user should be judged as a different person when the authentication value is greater than or equal to the value. For example, the maximum authentication permissible value is set at 0.5, which is the middle value between an authentication value of 0 that the authentication value approaches when the registration information and biometric information acquired by the authentication information acquirer 181 are similar to each other and an authentication value of 1 that the authentication value approaches when the registration information and the biometric information are not similar to each other.

A value indicating a difference between an authentication threshold and an authentication permissible value is referred to as an authentication permissible range value. The authentication permissible range value indicates a range in which whether or not the user is an authentic user is indeterminate. When the authentication value is within the authentication permissible range value, whether or not the user is an authentic user is not determined only by biometric information, but determined by biometric information in conjunction with action information specific to the user. Specifically, when the authentication value is within the authentication permissible range value, the user is authenticated as an authentic user when action information specific to the user matches a pass condition therefor. In addition, when the authentication value is within the authentication permissible range value, the user is not authenticated as an authentic user when no action information specific to the user matches the pass condition therefor. User authentication based on action information is hereinafter referred to as auxiliary authentication. The authentication permissible range value is a value that is set in advance in such a manner that the user may generally be considered to be an authentic user when the authentication value falls within this range. The authentication permissible range value is, for example, set at 0.08, which is a value less than or equal to ten percent of a difference between an authentication value of 0 that the authentication value approaches when the registration information and biometric information acquired by the authentication information acquirer 181 are similar to each other and an authentication value of 1 that the authentication value approaches when the registration information and the biometric information are not similar to each other. Note that, when the authentication threshold coincides with the upper limit value thereof, the authentication permissible range value is defined as a value obtained by subtracting the upper limit value of the authentication threshold from the maximum authentication permissible value. For example, when the upper limit of the authentication threshold is set at 0.45 and the maximum authentication permissible value is set at 0.5, the authentication permissible range value is 0.05. Therefore, when the authentication threshold coincides with the upper limit value thereof, the authentication permissible range value takes a smaller value than that when the authentication threshold has not reached the upper limit value.

Next, the table of the action information database for authentication 172 is described below with reference to FIG. 5B. The table of the action information database for authentication 172 stores the types of actions of the user, such as communication connection and event execution, acquired information acquired by the authentication information acquirer 181 illustrated in FIG. 4, the latest states of respective actions, and pass conditions for respective actions. In the acquired information, for example, when the type of action is communication connection, a connection destination address, a service set identifier (SSID), a basic service set identifier (BSSID), or the like is stored; when the type of action is event execution, location information, such as the name, address, or the like of a location where an event is to be held, which is saved in an appointment book in advance, is stored; when the type of action is distance between the face of the user and the terminal device, a distance is stored; and when the type of action is device connection, a name, identifier (ID), or the like indicating a connection destination device is stored.

The latest state of each action is, for example, the total number of times that the terminal device 1 has so far been connected to a communication connection destination indicated in the acquired information when the type of action is communication connection. The initial value of the total number of times of connection to the communication connection destination is 0, and the total number of times of connection is increased by one every time the terminal device 1 is connected to the communication connection destination. In addition, when the type of action is event execution, distance between the location stored in the acquired information and the current position of the user is stored. When the type of action is the distance between the face and the terminal device 1, an average distance of distances between the face and the terminal device 1 that have been calculated when the user was authenticated as an authentic user, up to that time is stored. The average distance between the face and the terminal device 1 is updated every time the user is authenticated as an authentic user. Note that the initial value of the average distance between the face and the terminal device 1 is set to a distance calculated when the biometric information illustrated in FIG. 5A was registered in advance before the user himself/herself is authenticated by the terminal device 1.

If the type of action is device connection, whether or not the terminal device 1 is connected to a device indicated by the name, ID, or the like stored in the acquired information is stored. The device connection is, for example, connection between a device and the terminal device 1 that are paired by Bluetooth (registered trademark). The pass condition of each action is a predefined condition that can ensure reliability of the action.

Next, the table of the tilt information table 173 is illustrated in FIG. 5C. The tilt information table 173 stores an angle indicating a tilt of the terminal device 1 acquired by the tilt detector 13 illustrated in FIG. 4, an acquisition date and time when the angle was acquired, and standby time that serves as an interval at which a tilt is detected. The angle indicating a tilt of the terminal device 1 is acquired by the authentication information acquirer 181 illustrated in FIG. 4 from the tilt detector 13 and updated every time the standby time elapses. In addition, when the angle is updated, the acquisition date and time when the angle was acquired is also updated.

When the terminal device 1 according to the present embodiment completes execution of initialization processing that is processing performed after power-on, or returns from a sleep state, the terminal device 1 enters a locked state in which any operation of each function is not permitted until the authentication becomes successful. When authentication is requested at the time of entering the locked state or performing an operation of each function, the terminal controller 18 illustrated in FIG. 2 executes the authentication processing program 170 stored in the terminal storage 17 and determines whether or not the user is an authentic user. Processing of the authentication processing program 170 executed by the terminal controller 18 is described below with reference to a flowchart of the authentication processing illustrated in FIGS. 6A and 6B.

Figure 6A:
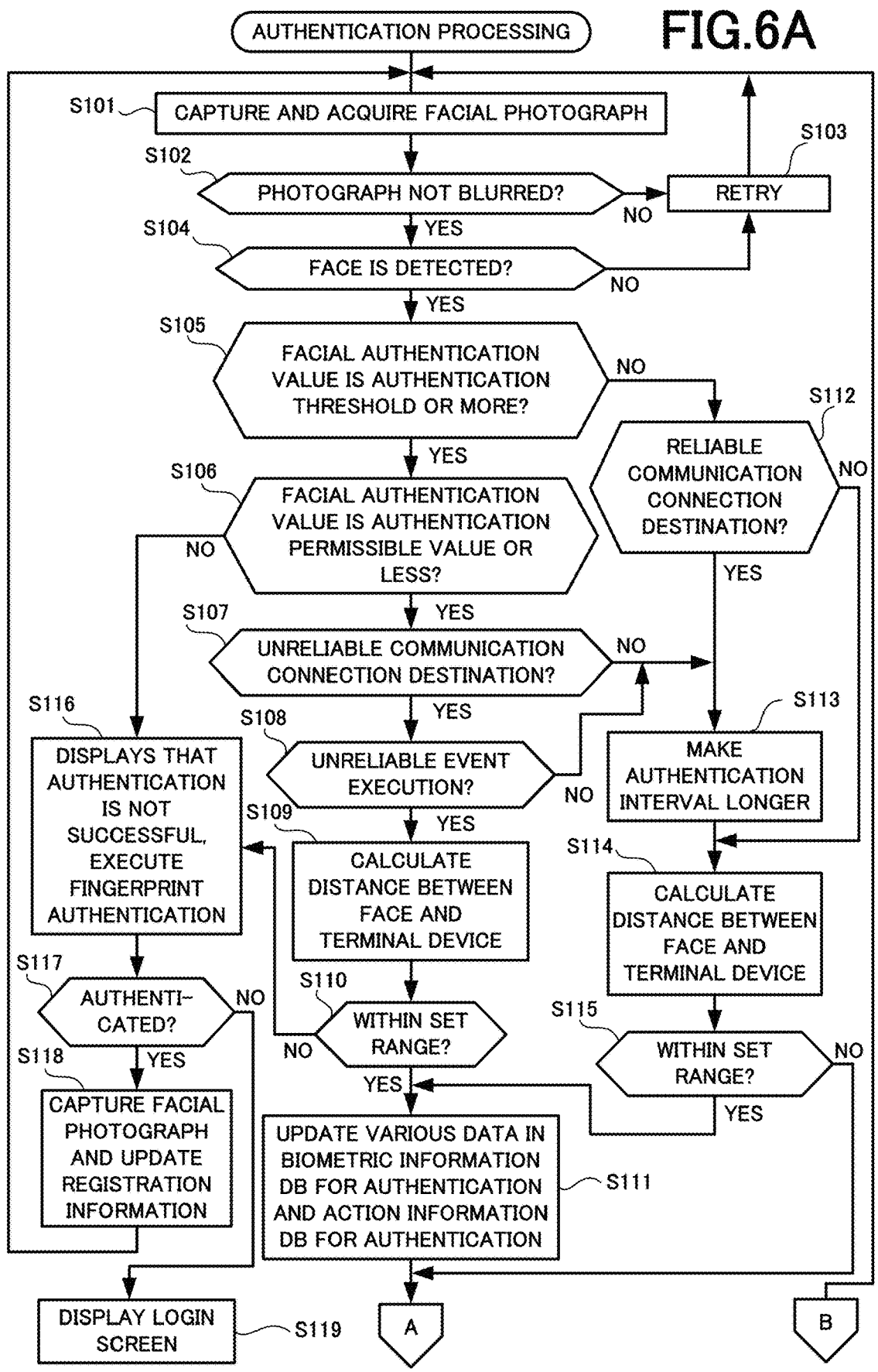
FIG. 6A is a flowchart of authentication processing according to the embodiment.

First, FIG. 6A is referred to. In the present embodiment, it is assumed that a facial image of the user is used as biometric information. The authentication information acquirer 181 illustrated in FIG. 4 causes the imager 11 to capture a facial photograph of the user operating the terminal device 1. Specifically, the authentication information acquirer 181 causes the in-camera 11A to capture a facial photograph of the user facing the front surface of the terminal device 1. The authentication information acquirer 181 acquires the captured facial photograph of the user from the imager 11 (step S101). The authentication information acquirer 181 determines whether or not the acquired facial photograph of the user is clear, that is, not blurred (step S102). When the facial photograph of the user is blurred (step S102; NO), the authentication information acquirer 181 causes the imager 11 to retry capturing a facial photograph of the user (step S103). When the facial photograph of the user is not blurred (step S102; YES), the authentication information acquirer 181 determines whether or not the face of the user can be detected from the facial photograph of the user captured by the imager 11 (step S104).

When the face of the user cannot be detected from the facial photograph of the user (step S104; NO), the authentication information acquirer 181 causes the imager 11 to retry capturing a facial photograph of the user (step S103). Note that, when the face of the user cannot be detected from the facial photograph of the user, the terminal device 1 may be locked in such a way that the user who is currently operating the terminal device 1 is prevented from further operating the terminal device 1, a message to the effect that another authentication method needs to be used may be displayed, or other measures may be taken. When the face of the user can be detected from the facial photograph of the user (step S104; YES), the authentication information acquirer 181 calculates a feature amount of the image of the detected face of the user. The authentication information acquirer 181 transmits the calculated feature amount of the facial image of the user to the authentication determiner 182.

The authentication determiner 182 acquires the biometric information database for authentication 171 stored in the terminal storage 17 illustrated in FIG. 2. From the table of the biometric information database for authentication 171 illustrated in FIG. 5A, the authentication determiner 182 acquires a feature amount of a facial image stored in the registration information and an authentication permissible value and an authentication threshold for an authentication value that are associated with the "face" among the types of biometric information. The authentication determiner 182 compares the feature amount of the facial image in the registration information acquired from the biometric information database for authentication 171 with the feature amount of the facial image received from the authentication information acquirer 181 and calculates an authentication value of the face, based on a result of the comparison. The authentication determiner 182 determines whether or not the calculated authentication value of the face is greater than or equal to the authentication threshold acquired from the biometric information database for authentication 171 (step S105).

When the calculated authentication value of the face is greater than or equal to the authentication threshold (step S105; YES), the authentication determiner 182 determines whether or not the calculated authentication value of the face is less than or equal to the authentication permissible value acquired from the biometric information database for authentication 171 (step S106). When the calculated authentication value of the face is less than or equal to the authentication permissible value (step S106; YES), whether or not the user using the terminal device 1 is an authentic user is indeterminate, and the authentication determiner 182 therefore performs auxiliary authentication that is authentication based on action information. First, the authentication determiner 182 causes the authentication information acquirer 181 to acquire a communication connection destination to which is currently connected from the communicator 10. The authentication determiner 182 receives the acquired current communication connection destination of the communicator 10 from the authentication information acquirer 181.

Succeedingly, the authentication determiner 182 acquires the action information database for authentication 172 from the terminal storage 17 illustrated in FIG. 2. The authentication determiner 182 acquires acquired information, the number of times of connection, and a pass condition associated with the "communication connection" among the types of actions stored in the table of the action information database for authentication 172 illustrated in FIG. 5B. For example, as illustrated in FIG. 5B, ABC_WLAN and 123WLAN, which are SSIDs, are stored in the acquired information associated with the "communication connection". With regard to ABC_WLAN, "31 times" is stored as the number of times of connection and "the number of times of connection: 100 times or more" is stored as the pass condition. In addition, with regard to 123WLAN, "157 times" is stored as the number of times of connection and "the number of times of connection: 100 times or more" is stored as the pass condition. Note that, in the following description, an object that satisfies a pass condition is referred to as a reliable object, and an object that does not satisfy a pass condition is referred to as unreliable object.

The authentication determiner 182 compares the current communication connection destination of the communicator 10 received from the authentication information acquirer 181 with the acquired information acquired from the action information database for authentication 172 and determines whether or not the current communication connection destination is an unreliable connection destination (step S107). It is now assumed that, for example, the SSID ABC_WLAN is acquired as the current communication connection destination of the communicator 10. The number of times of connection to ABC_WLAN stored in the acquired information associated with the action type "communication connection" in the action information database for authentication 172 is 31 times, and the number of times of connection required by the pass condition is 100 times or more. Since, therefore, the current communication connection destination is an unreliable communication connection destination (step S107; YES), the authentication determiner 182 determines whether or not an unreliable event is being executed (step S108).

The authentication determiner 182 causes the authentication information acquirer 181 to acquire details of an event executed immediately before the authentication from the operation inputter 14. The authentication determiner 182 acquires, from a calendar with which the terminal device 1 is provided, information indicating whether or not there is a schedule at the current date and time and information on the location where the schedule is carried out. If there is no schedule on the day, the authentication determiner 182 determines that the event execution is execution of an unreliable event (step S108; YES), and calculates distance between the face and the terminal device 1 (step S109). When there is a schedule on the day, the authentication determiner 182 causes the authentication information acquirer 181 to acquire current position information from the position detector 16. Succeedingly, the authentication determiner 182 acquires the action information database for authentication 172 from the terminal storage 17 illustrated in FIG. 2.

The authentication determiner 182 acquires acquired information and a pass condition associated with the "event execution" among the types of actions stored in the table of the action information database for authentication 172 illustrated in FIG. 5B. For example, as illustrated in FIG. 5B, "○× park" and "▲● movie theater" are stored as locations where events are held in the acquired information associated with the "event execution", and "distance: within 100 m" is stored as a pass condition for both pieces of acquired information.

It is now assumed that, for example, "○× park" is stored in the calendar with which the terminal device 1 is provided, as the location of an event held at the current date and time. The authentication determiner 182 compares the current position information acquired by the authentication information acquirer 181 from the position detector 16 with the position information of "○× park" that is the location of the event held at the current date and time. For example, it is assumed that the distance between the current position information and the position information of the event location "○× park" is 113 m. In this case, the authentication determiner 182 determines that the event execution is execution of an unreliable event (step S108; YES), and calculates distance between the face and the terminal device 1 (step S109). The distance between the face of the user and the terminal device 1 is calculated based on a ratio of the face of the user to the facial photograph of the user facing the front surface of the terminal device 1 captured by the in-camera 11A illustrated in FIG. 1.

Succeedingly, the authentication determiner 182 acquires the action information database for authentication 172 from the terminal storage 17 illustrated in FIG. 2. The authentication determiner 182 acquires an average distance and a pass condition associated with the "distance between the face and the terminal device" among the types of actions stored in the table of the action information database for authentication 172 illustrated in FIG. 5B. For example, as illustrated in FIG. 5B, 262 mm is stored as an average distance of the "distances between the face and the terminal device", and "within plus or minus 20 mm of the average distance" is stored as a pass condition.

The authentication determiner 182 determines whether or not the distance between the face of the user and the terminal device 1 calculated in step S109 falls within a set range that is set in the pass condition acquired from the action information database for authentication 172 (step S110). Specifically, since the average distance acquired from the action information database for authentication 172 is 262 mm and the pass condition is "within plus or minus 20 mm of the average distance", the authentication determiner 182 determines whether or not the distance is within a range from 242 mm to 282 mm.

When the distance between the face of the user and the terminal device 1 calculated in step S109 is within the range from 242 mm to 282 mm (step S110; YES), the authentication determiner 182 authenticates the user using the terminal device 1 as an authentic user. The authentication determiner 182 causes the authentication information updater 184 to update various data stored in the biometric information database for authentication 171 and the action information database for authentication 172 illustrated in FIG. 2 (step S111).

Specifically, the authentication information updater 184 updates the registration information associated with the biometric information type "face" in the table of the biometric information database for authentication 171 illustrated in FIG. 5A by adding the feature amount of the facial image received by the authentication determiner 182 from the authentication information acquirer 181 to the feature amount of the facial image stored in the registration information. Succeedingly, the authentication information updater 184 updates the number of times of connection stored in the latest state associated with the action type "communication connection" in the table of the action information database for authentication 172 illustrated in FIG. 5B by adding 1 thereto. In addition, the authentication information updater 184 updates the latest state associated with the action type "distance between the face and the terminal device" stored in the table of the action information database for authentication 172 illustrated in FIG. 5B with the average distance calculated from the stored average distance and the "distance between the face and the terminal device" calculated in step S109.

Updating the biometric information stored in the biometric information database for authentication 171 and the action information stored in the action information database for authentication 172 in this way improves accuracy of the biometric information and action information of the user. Therefore, accuracy of authentication of the user can be improved.

In addition, when the authentication value of the face calculated by the authentication determiner 182 is less than the authentication threshold for the authentication value (step S105; NO), the authentication determiner 182 causes the authentication information acquirer 181 to acquire a currently connected communication destination from the communicator 10. The authentication determiner 182 receives the acquired current communication connection destination of the communicator 10 from the authentication information acquirer 181. Succeedingly, the authentication determiner 182 acquires the action information database for authentication 172 from the terminal storage 17 illustrated in FIG. 2. The authentication determiner 182 acquires acquired information, the number of times of connection, and a pass condition associated with the "communication connection" among the types of actions stored in the table of the action information database for authentication 172 illustrated in FIG. 5B. The authentication determiner 182 compares the current communication connection destination of the communicator 10 received from the authentication information acquirer 181 with the acquired information acquired from the action information database for authentication 172 and determines whether or not the current communication connection destination is a reliable connection destination (step S112).

It is now assumed that, for example, the SSID 123WLAN is acquired as the current communication connection destination of the communicator 10. The number of times of connection to 123WLAN stored in the acquired information associated with the action type "communication connection" in the action information database for authentication 172 is 156 times, and the number of times of connection required by the pass condition is 100 times or more. Since, therefore, the current communication connection destination is a reliable communication connection destination (step S112; YES), the authentication determiner 182 authenticates the user using the terminal device 1 as an authentic user. Subsequently, the authentication determiner 182 makes the authentication interval longer than the current authentication interval (step S113). This is because when the current communication connection destination is a reliable communication connection destination, the user himself/herself is considered to be in a reliable environment, such as the home and a workplace. In this case, it is only required to make the authentication interval longer than the current authentication interval to reduce frequency of authentication and perform the authentication a minimum number of times.

It is now assumed that, for example, the SSID ABC_WLAN is acquired as the current communication connection destination of the communicator 10. The number of times of connection to ABC_WLAN stored in the acquired information associated with the action type "communication connection" in the action information database for authentication 172 is 31 times, and the number of times of connection required by the pass condition is 100 times or more. Since, therefore, the current communication connection destination is not a reliable communication connection destination (step S112; NO), the authentication determiner 182 neither authenticates the user using the terminal device 1 as an authentic user nor makes the authentication interval longer than the current authentication interval.

It is now assumed that, in step S107, for example, the SSID 123WLAN is acquired as the current communication connection destination of the communicator 10. The number of times of connection to 123WLAN stored in the acquired information associated with the action type "communication connection" in the action information database for authentication 172 is 156 times, and the number of times of connection required by the pass condition is 100 times or more. Since, therefore, the current communication connection destination is a reliable communication connection destination (step S107; NO), the authentication determiner 182 authenticates the user using the terminal device 1 as an authentic user.

In addition, it is now assumed that, in step S108, for example, "▲● movie theater" is stored in the calendar with which the terminal device 1 is provided, as the location of an event to be held at the current date and time. The authentication determiner 182 compares the current position information acquired by the authentication information acquirer 181 from the position detector 16 with the position information of "▲● movie theater" that is the location of the event to be held at the current date and time. For example, it is assumed that the distance between the current position information and the position information of the event location "▲● movie theater" is 72 m. In this case, the authentication determiner 182 determines that the event execution is execution of a reliable event (step S108; NO), and authenticates the user using the terminal device 1 as an authentic user.

The authentication determiner 182 makes the authentication interval longer than the current authentication interval (step S113). The authentication determiner 182 calculates distance between the face of the user and the terminal device 1 (step S114). Succeedingly, the authentication determiner 182 acquires the action information database for authentication 172 from the terminal storage 17 illustrated in FIG. 2. The authentication determiner 182 determines whether or not the distance between the face of the user and the terminal device 1 calculated in step S114 falls within a set range that is set in the pass condition acquired from the action information database for authentication 172 (step S115). When the distance between the face of the user and the terminal device 1 calculated in step S114 is within the set range (step S115; YES), the authentication determiner 182 authenticates the user using the terminal device 1 as an authentic user. The authentication determiner 182 causes the authentication information updater 184 to update various data stored in the biometric information database for authentication 171 and the action information database for authentication 172 illustrated in FIG. 2 (step S111).

Specifically, the authentication information updater 184 updates the registration information associated with the biometric information type "face" in the table of the biometric information database for authentication 171 illustrated in FIG. 5A by adding the feature amount of the facial image received by the authentication determiner 182 from the authentication information acquirer 181 in step S105 to the feature amount of the facial image stored in the registration information.

Succeedingly, the authentication information updater 184 updates the number of times of connection stored in the latest state associated with the action type "communication connection" in the table of the action information database for authentication 172 illustrated in FIG. 5B by adding 1 thereto. Succeedingly, the authentication information updater 184 updates the latest state associated with the action type "event execution" in the table of the action information database for authentication 172 by writing the distance between the location of the event and the terminal device 1 calculated in step S108 thereinto. In addition, the authentication information updater 184 updates the latest state associated with the action type "distance between the face and the terminal device" stored in the table of the action information database for authentication 172 illustrated in FIG. 5B with the average distance calculated from the average distance stored in the latest state and the "distance between the face and the terminal device" calculated in step S114.

When the distance between the face of the user and the terminal device 1 calculated in step S114 is not within the set range (Step S115; NO), the authentication determiner 182 does not cause the authentication information updater 184 to update various data stored in the biometric information database for authentication 171 and the action information database for authentication 172 illustrated in FIG. 2.

In addition, when the authentication value of the face calculated by the authentication determiner 182 is not less than or equal to the authentication permissible value of the authentication value (step S106; NO) or the distance between the face and the terminal device is not within the set range in step S110 (step S110; NO), the authentication determiner 182 determines that the user using the terminal device 1 is not an authentic user. The authentication determiner 182 causes the authentication result display 183 illustrated in FIG. 4 to display on the display 19 that the authentication is not successful. Succeedingly, the authentication determiner 182 calls an existing biometric authentication means with which the terminal device 1 is provided. Herein, it is assumed that fingerprint authentication is called as the existing biometric authentication. The authentication determiner 182 executes the fingerprint authentication (step S116).

When the fingerprint authentication is successful (step S117; YES), the authentication information acquirer 181 causes the imager 11 to capture a facial photograph of the user operating the terminal device 1 in accordance with an instruction from the authentication determiner 182. The authentication information acquirer 181 acquires the image of the captured facial photograph of the user from the imager 11 and calculates a feature amount of the facial image of the user. The authentication information acquirer 181 transmits the calculated feature amount of the facial image of the user to the authentication determiner 182. The authentication determiner 182 transmits the received feature amount of the facial image of the user to the authentication information updater 184 illustrated in FIG. 4. The authentication information updater 184 updates the feature amount of the facial image stored in the registration information associated with the biometric information type "face" in the table of the biometric information database for authentication 171 illustrated in FIG. 5A by adding the received feature amount of the facial image of the user thereto (Step S118). The authentication determiner 182 returns to step S101 and performs the steps from step S101 onward.

In addition, when the fingerprint authentication is not successful (step S117; NO), the authentication determiner 182 causes the authentication result display 183 illustrated in FIG. 4 to display on the display 19 that the authentication is not successful. Succeedingly, the authentication determiner 182 causes the authentication result display 183 illustrated in FIG. 4 to display a login screen on the display 19 (step S119).

The process now proceeds to FIG. 6B. The authentication determiner 182 determines whether or not the biometric authentication and the auxiliary authentication have been successful a preset number of times (Step S120). The preset number of times is an arbitrary number, such as 10 times in a row and 20 times in total after the terminal device 1 is activated. When the biometric authentication and the auxiliary authentication have been successful the preset number of times (step S120; YES), the authentication determiner 182 calculates an average value of authentication values of the face obtained in the preset number of times of authentication (step S121). Specifically, the authentication determiner 182 acquires the biometric information database for authentication 171 illustrated in FIG. 2 from the terminal storage 17. The authentication determiner 182 acquires the average value of authentication values associated with the "face" among the types of biometric information from the table of the biometric information database for authentication 171 illustrated in FIG. 6A. The authentication determiner 182 calculates an average value of authentication values of the face by adding the authentication value of the face calculated in step S105 and the average value of authentication values acquired from the biometric information database for authentication 171 and dividing a result of the addition by two. In addition, when the biometric authentication and the auxiliary authentication have not been successful the preset number of times (step S120; NO), the process skips steps S121 to S123 and proceeds to step S124.

The authentication determiner 182 transmits the average value of authentication values of the face calculated in step S121 to the authentication information updater 184. The authentication information updater 184 compares the received average value of authentication values of the face with a preset upper limit value of the authentication threshold. When the average value of authentication values of the face is greater than or equal to the preset upper limit value of the authentication threshold, the authentication information updater 184 updates the authentication threshold associated with the "face" among the types of biometric information in the table of the biometric information database for authentication 171 illustrated in FIG. 5A by writing the upper limit value of the authentication threshold thereinto. When the average value of authentication values of the face is less than or equal to the preset upper limit value of the authentication threshold, the authentication information updater 184 updates the authentication threshold associated with the "face" among the types of biometric information in the table of the biometric information database for authentication 171 illustrated in FIG. 5A by writing the average value of authentication values of the face calculated in step S121 thereinto (step S122).

Next, the authentication information updater 184 updates the authentication permissible value (step S123). Specifically, when the average value of authentication values of the face calculated in step S121 is greater than or equal to the preset upper limit value of the authentication threshold, the authentication information updater 184 sets a preset maximum authentication permissible value as the authentication permissible value. In addition, when the average value of authentication values of the face calculated in step S121 is less than or equal to the preset upper limit value of the authentication threshold and the sum of the average value of authentication values of the face calculated in step S121 and a default authentication permissible range value is less than or equal to the maximum authentication permissible value, the authentication information updater 184 sets the sum as the authentication permissible value. When the sum of the average value of authentication values of the face calculated in step S121 and the default authentication permissible range value is greater than or equal to the maximum authentication permissible value, the authentication information updater 184 sets the maximum authentication permissible value as the authentication permissible value. The authentication information updater 184 acquires the biometric information database for authentication 171 illustrated in FIG. 2 from the terminal storage 17. The authentication information updater 184 updates the authentication permissible value associated with the "face" among the types of biometric information in the table of the biometric information database for authentication 171 illustrated in FIG. 5A by writing the obtained authentication permissible value thereinto.

The authentication information acquirer 181 illustrated in FIG. 4 acquires a tilt angle of the terminal device 1 from the tilt detector 13. Succeedingly, the authentication information acquirer 181 acquires current date and time information from a not-illustrated timer (step S124). The authentication information acquirer 181 transmits the acquired tilt angle of the terminal device 1 and the current date and time information to the authentication determiner 182. The authentication determiner 182 transmits the received tilt angle of the terminal device 1 and the current date and time information to the authentication information updater 184. The authentication information updater 184 writes and saves the received tilt angle of the terminal device 1 and current date and time information in the tilt information table 173 stored in the terminal storage 17 illustrated in FIG. 2 (step S125).

The authentication determiner 182 acquires standby time stored in the table of the tilt information table 173 illustrated in FIG. 5C. The authentication determiner 182 transmits the acquired standby time to the authentication information acquirer 181. The authentication information acquirer 181 waits for data acquisition from the communicator 10, the imager 11, and the like during the received standby time (step S126). When the standby time ends, the authentication information acquirer 181 acquires a tilt angle of the terminal device 1 from the tilt detector 13. Succeedingly, the authentication information acquirer 181 acquires current date and time information from the not-illustrated timer (step S127).

The authentication information acquirer 181 transmits the acquired tilt angle of the terminal device 1 and the current date and time information to the authentication determiner 182.

The authentication determiner 182 acquires an angle of the terminal device 1 stored in the table of the tilt information table 173 illustrated in FIG. 5C. The authentication determiner 182 compares the tilt angle of the terminal device 1 received from the authentication information acquirer 181 with the angle of the terminal device 1 acquired from the tilt information table 173, and determines whether or not the angle has changed (step S128). When change in the angle of the terminal device 1 is greater than or equal to an angle of a predetermined set value, for example, 30 degrees (step S128; NO), the authentication determiner 182 determines that the terminal device 1 has been moved by the user and some operation has been performed on the terminal device 1, and the process returns to step S101 illustrated in FIG. 6A. Subsequently, the authentication determiner 182 performs the processing from step S101 onward.

In addition, when change in the angle of the terminal device 1 is less than or equal to the predetermined set angle (step S128; YES), the authentication determiner 182 determines that the terminal device 1 has not been moved by the user. Succeedingly, the authentication determiner 182 determines whether or not it is a timing to authenticate the user (step S129). The timing to authenticate the user is a timing at which a time equal to the preset authentication interval has elapsed. When it is a timing to authenticate the user (step S129; YES), the authentication determiner 182 returns to step S101 illustrated in FIG. 6A. Subsequently, the authentication determiner 182 performs the processing from step S101 onward. When it is not a timing to authenticate the user (step S129; NO), the authentication determiner 182 returns to step S125. The authentication determiner 182 performs the processing from steps S125 to S129.

Note that, in the above-described embodiment, when the authentication value obtained from the biometric information and the authentication threshold coincide with each other, whether the authentication is successful in a case where the authentication value obtained from the biometric information is less than or equal to the authentication threshold or a case where the authentication value obtained from the biometric information is greater than or equal to the authentication threshold may be determined. In addition, when the authentication value obtained from the biometric information and the authentication permissible value coincide with each other, whether the authentication is successful in a case where the authentication value obtained from the biometric information is less than or equal to the authentication permissible value or a case where the authentication value obtained from the biometric information is greater than or equal to the authentication permissible value may be determined.

As described above, the terminal device 1 according to the above-described embodiment is capable of authenticating the user himself/herself, based on biometric information, such as a facial image, a fingerprint, and a voiceprint of the user himself/herself, and action information, such as a user-specific behavior and an operation state when the user operates the terminal device 1, and enabling the user to execute various functions in the terminal device 1. In addition, the user authentication processing that is performed in the terminal device 1 is executed in the background and, at the same time, is capable of improving accuracy of the authentication by updating the biometric information and action information of the user, while the terminal device 1 is in operation. Because of this capability, security can be ensured while an operational burden on the user can be reduced.

Modification Example 1

In the above-described embodiment, authentication based on a facial image of the user and fingerprint authentication were used as authentication based on biometric information of the user. The embodiment is not limited to the above configuration, and the authentication based on biometric information may be performed using any one of voiceprint authentication, iris authentication, and the like. In addition, although, in the above-described embodiment, only the authentication based on a facial image of the user was used as a condition for determination using auxiliary authentication, the determination may be performed using a plurality of types of biometric information.

Modification Example 2

In the above-described embodiment, it was configured such that user authentication processing was achieved by executing the authentication processing program 170 illustrated in FIG. 2. All or some steps performed by the authentication processing program 170 may be achieved by a circuit constituted by a semiconductor chip, such as an application specific integrated circuit (ASIC) and a system large-scale integration (LSI), and various circuit elements.

Modification Example 3

In the above-described embodiment, connection to a reliable connection destination, execution of a reliable event, and distance between the face of the user and the terminal device 1 were used as a determination condition for auxiliary authentication. The embodiment is not limited to the above configuration, and another method may be used or included. For example, whether or not a device that the user himself/herself owns and the terminal device 1 are connected to each other by Bluetooth (registered trademark) is determined, and, when the device and the terminal device 1 are connected in such a manner, the user is authenticated as an authentic user. In order to use devices that are connected to each other by Bluetooth (registered trademark), "pairing" the devices with each other needs to be done. Thus, connection of devices by Bluetooth (registered trademark) has strong identifiability of an individual, and using the connection as auxiliary authentication enables the user himself/herself to be authenticated. Further, whether or not the user is an authentic user may be determined depending on a pattern, regularity, and the like of an action route of the user acquired by the position detector 16 illustrated in FIG. 2, and, when the pattern, regularity, and the like of the action route coincide with criteria, the user may be determined as an authentic user.

Modification Example 4

In the above-described embodiment, the user was authenticated as an authentic user when a type of authentication among the types of auxiliary authentication was successful. The embodiment is not limited to the above configuration, and it may be configured such that the user is authenticated as an authentic user only when all of the plurality of types of authentication are successful. This configuration enables accuracy of authentication to be further improved.

Modification Example 5

In the above-described embodiment, when the biometric authentication and the auxiliary authentication are successful, the authentication determiner 182 makes the authentication interval longer than the current authentication interval and reduces frequency of authentication in step S113 in the flowchart illustrated in FIG. 6A. However, the embodiment is not limited to the above configuration, and the authentication determiner 182 neither have to make the authentication interval longer than the current authentication interval nor reduce frequency of authentication when the biometric authentication and the auxiliary authentication are successful. Specifically, step S113 in the flowchart illustrated in FIG. 6A does not have to be performed.

Modification Example 6

In the above-described embodiment, when authentication of the user has been successful, the user is continuously operating the terminal device 1, and tilt of the terminal device 1 has not changed, it is possible to determine that the user himself/herself has been operating the terminal device 1. In this case, the authentication threshold and the authentication permissible value in the biometric authentication may be relaxed or the authentication interval may be made longer. This configuration enables minimum authentication of the user himself/herself to be performed in the background and, at the same time, use of resources of the terminal device 1 to be economized.

Modification Example 7

In the above-described embodiment, it was configured such that the authentication was performed in the background at a preset authentication interval. The embodiment is not limited to the above configuration, and it may be configured such that, without defining timings and an interval of authentication, the authentication is performed in the background at random timings. For example, it may be configured such that the authentication is performed at any time when a spatial change, such as a change in the position and a change in the tilt, of the terminal device 1 is detected by any one of various sensors mounted on the terminal device 1. Alternatively, it may be configured such that the authentication is performed when the user performs an operation for performing a special processing on the terminal device 1, an irregular operation, or the like.

In addition, the terminal device 1 according to the embodiment of the present disclosure can be achieved by using a general computer system without relying on a dedicated system. For example, a computer that is capable of, by storing programs for achieving respective functions of the terminal device 1 in a recording medium, such as a computer-readable compact disc read only memory (CD-ROM) and digital versatile disc read only memory (DVD-ROM), and distributing the recording medium and installing the programs in the computer, achieving the above-described functions may be configured. When respective functions are achieved by sharing of operation between the operating system (OS) and applications or by cooperation between the OS and the applications, only the applications may be stored in the recording medium.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2019-141648, filed on Jul. 31, 2019, the entire disclosure of which is incorporated by reference herein.

INDUSTRIAL APPLICABILITY

The present disclosure can be suitably used for a terminal device.

REFERENCE SIGNS LIST

1 Terminal device
10 Communicator
11 Imager
11A In-camera
11B Main camera
12 Audio input/output
12A Speaker
12B Microphone
13 Tilt detector
14 Operation inputter
15 Fingerprint detector
15A Left fingerprint sensor
15B Right fingerprint sensor
16 Position detector
17 Terminal storage
18 Terminal controller
19 Display
21 Processor
22 Memory
23 Display controller
24 Display device
25 I/O port
26 Storage device
27 Communication device
28 Data bus
170 Authentication processing program
171 Biometric information database for authentication
172 Action information database for authentication
173 Tilt information table
181 Authentication information acquirer
182 Authentication determiner
183 Authentication result display
184 Authentication information updater

The invention claimed is:

1. A terminal device, comprising:
a processor comprising:
an authentication information acquirer configured to acquire a plurality of pieces of authentication information;
an authentication determiner configured to determine whether or not authentication is successful based on, among the plurality of pieces of authentication information acquired by the authentication information acquirer, at least one piece of authentication information; and
an authentication information updater configured to, when the authentication determiner determines that authentication is successful, update a plurality of pieces of saved authentication information with the plurality of pieces of authentication information acquired by the authentication information acquirer,
wherein the authentication determiner is configured to, in a background,
determine that authentication is successful when first authentication information acquired by the authentication information acquirer falls below a predetermined authentication threshold,
when the first authentication information is greater than or equal to the authentication threshold and less than or equal to a predetermined authentication permissible value, determine whether or not authentication is successful based on second authentication information acquired by the authentication information acquirer, and
change an authentication interval according to a result of the determination based on the second authentication information.

2. The terminal device according to claim 1, wherein, when the authentication determiner determines that the first authentication information is greater than or equal to the authentication permissible value or determines that authentication is failure based on the second authentication information, the authentication determiner further determines whether or not authentication is successful based on third authentication information acquired by the authentication information acquirer.

3. The terminal device according to claim 2, wherein
the terminal device includes a tilt detector configured to detect an angle of tilt of a terminal device, and
when, while a user is using the terminal device, an angle of the terminal device detected by the tilt detector is different from a saved angle or the authentication interval has elapsed, the authentication determiner determines whether or not authentication is successful based on, among the plurality of pieces of authentication information acquired by the authentication information acquirer, at least a piece of authentication information or a plurality of pieces of authentication information.

4. The terminal device according to claim 1, wherein
the terminal device includes a tilt detector configured to detect an angle of tilt of a terminal device, and
when, while a user is using the terminal device, an angle of the terminal device detected by the tilt detector is different from a saved angle or the authentication interval has elapsed, the authentication determiner determines whether or not authentication is successful based on, among the plurality of pieces of authentication information acquired by the authentication information acquirer, at least a piece of authentication information or a plurality of pieces of authentication information.

5. A terminal device, comprising:
an authentication information acquirer configured to acquire a plurality of pieces of authentication information;
a tilt detector configured to detect an angle of tilt of the terminal device;

an authentication determiner configured to determine whether or not authentication is successful based on, among the plurality of pieces of authentication information acquired by the authentication information acquirer, at least one piece of authentication information; and an authentication information updater configured to, when the authentication determiner determines that authentication is successful, update a plurality of pieces of saved authentication information with the plurality of pieces of authentication information acquired by the authentication information acquirer, wherein the authentication determiner is configured to, in a background, when, while a user is using the terminal device, an angle of the terminal device detected by the tilt detector is different from a saved angle or a predetermined authentication interval has elapsed, determine that authentication is successful when first authentication information acquired by the authentication information acquirer falls below a predetermined authentication threshold, when the first authentication information is greater than or equal to the authentication threshold and less than or equal to a predetermined authentication permissible value, determine whether or not authentication is successful based on second authentication information acquired by the authentication information acquirer.

6. An information processing method executable by a terminal device, the information processing method comprising:

acquiring a plurality of pieces of authentication information;

determining whether or not authentication is successful based on, among the acquired plurality of pieces of authentication information, at least one piece of authentication information;

when the authentication is determined to be successful, updating a plurality of pieces of saved authentication information with the plurality of pieces of acquired authentication information; and in a background, determining that authentication is successful when acquired first authentication information falls below a predetermined authentication threshold, and when the first authentication information is greater than or equal to the authentication threshold and less than or equal to a predetermined authentication permissible value, determining whether or not authentication is successful based on acquired second authentication information, and changing an authentication interval according to a result of the determination based on the second authentication information.

7. A non-transitory computer-readable recording medium storing a program for causing a computer to perform:

acquiring a plurality of pieces of authentication information;

determining whether or not authentication is successful based on, among the plurality of acquired authentication information, at least one piece of authentication information;

when the authentication is determined to be successful, updating a plurality of pieces of saved authentication information with the plurality of pieces of acquired authentication information; and in a background, determining that authentication is successful when acquired first authentication information falls below a predetermined authentication threshold, and when the first authentication information is greater than or equal to the authentication threshold and less than or equal to a predetermined authentication permissible value, determining whether or not authentication is successful based on acquired second authentication information.

* * * * *